March 28, 1967 W. H. FISCHER 3,311,690
INJECTION MOLDING METHOD FOR ENCAPSULATING METAL OBJECTS
Filed March 13, 1963 3 Sheets-Sheet 1
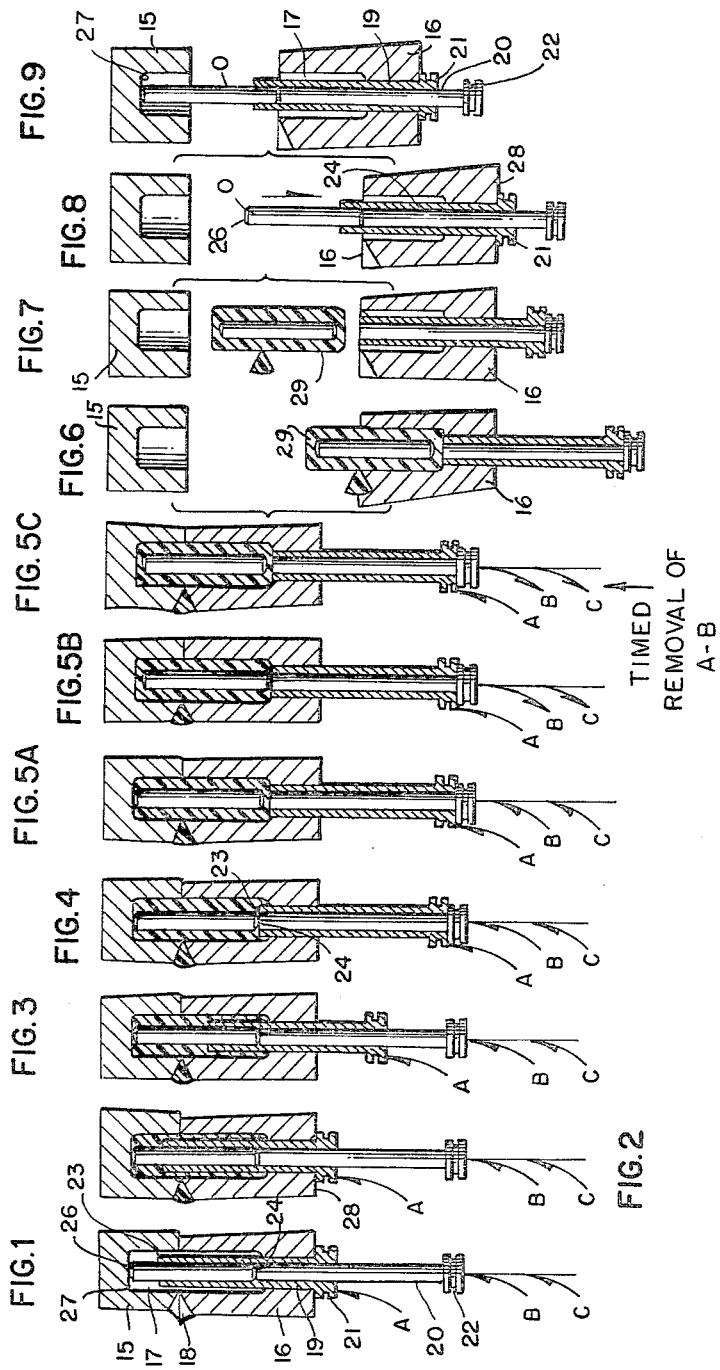
INVENTOR:
WILLIAM H. FISCHER
BY
ATT'YS March 28, 1967 W. H. FISCHER 3,311,690
INJECTION MOLDING METHOD FOR ENCAPSULATING METAL OBJECTS
Filed March 13, 1963 3 Sheets-Sheet 2
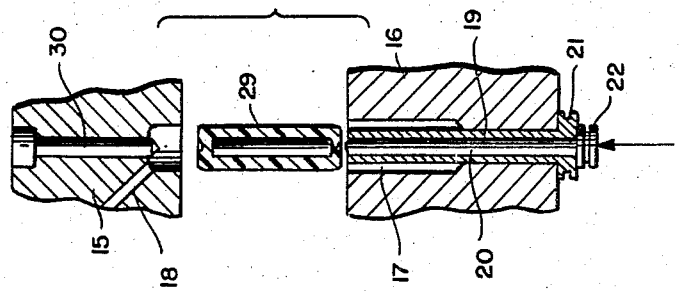
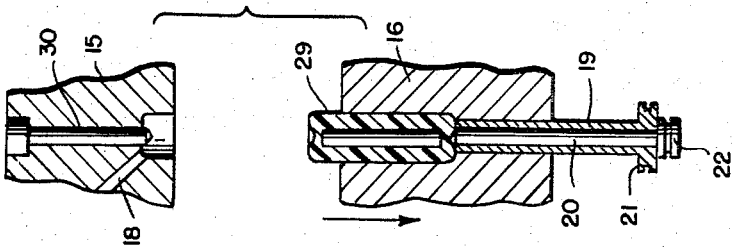
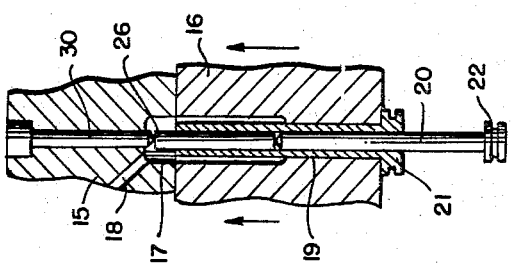
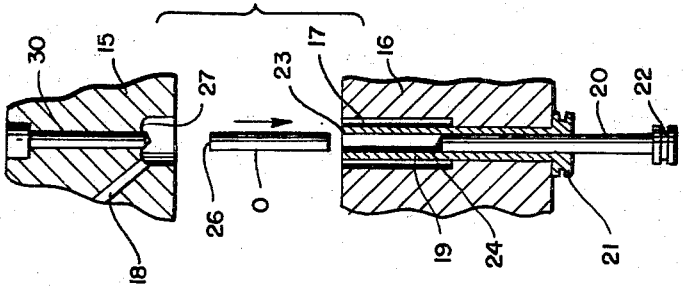
INVENTOR:
WILLIAM H. FISCHER
BY
ATT'YS

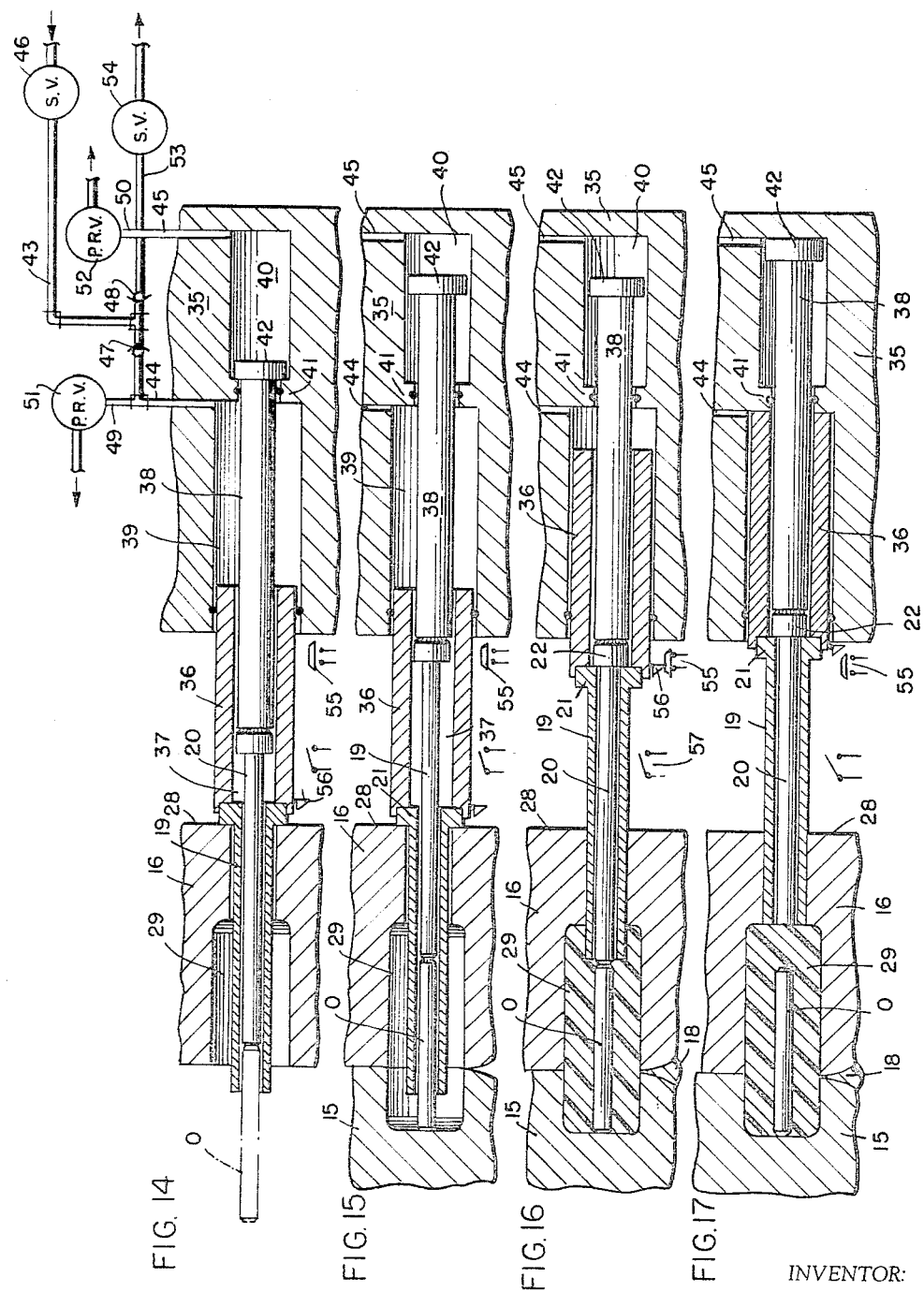

United States Patent Office 3,311,690
Patented Mar. 28, 1967

3,311,690
INJECTION MOLDING METHOD FOR ENCAPSULATING METAL OBJECTS
William H. Fischer, McHenry, Ill., assignor to Continuous Molding Corporation, Niles, Ill., a corporation of Illinois
Filed Mar. 13, 1963, Ser. No. 264,838
5 Claims. (Cl. 264—278)

This invention relates to an improved method for encapsulating metal objects in plastic materials by injection molding procedures.

In modern industry it is often necessary to envelop forms of objects in solid plastic enclosures either for the protection or insulation of the object or for the reinforcement of a plastic form for special use. Various apparatus and methods have been devised and employed for this purpose with varying acceptance for the mass production of the plastic-encapsulated objects. However, the apparatus and procedures heretofore employed have been limited as to the nature of the final product and as to uses for automatic molding apparatus.

The main objects of this invention are: to provide an improved method for encapsulating metal objects in solid plastic substances; to provide such an improved method as will permit either the complete or the partial encasement of an object in a solid plastic substance; to provide such a method whereby the location of an insert in a solid molded body is determined solely by adjustment of operating forces; and to provide an improved method of encapsulating metal elements which is both rapid and economically practical for the mass production of metal cored plastic objects of substantially any form.

In the adaptations shown in the accompanying drawings:

FIGURES 1 through 9 are a series of diagrammatic views showing the successive relative positions of a preferred structuring of a die for practicing the hereinafter-described method for effecting either a total or a partial encapsulation of an object;

FIGS. 10 through 13 are a series of diagrammatic views showing the successive positions of a modified structuring of a die for practicing the encapsulation of an object; and FIGS. 14 through 17 illustrate schematically, an arrangement of apparatus for hydraulic control of the insert positioning means and its manner of operation.

The essential concept of this invention involves the structuring of a die mechanism to practice the method of seating an object to be encapsulated on a temporary support means reciprocably mounted in one die part, of a pair of die parts forming a molding cavity, whereby the time-controlled, variably regulated movement of the support means, coordinated with the pressured injection of a fluid plastic substance into the die cavity, results in the complete or partial encapsulation of the object, as circumstances may require.

The mass production of molded plastic products is a highly developed art involving, as a rule, automatic, multiple die, progressive molding machines wherein the various mechanisms for opening and closing the dies and injecting the plastic substance to be molded are controlled by a suitable form and arrangement of timing and transferring means. Those experienced in the use of such equipment for molding plastic substances understand that the timing and transferring means has to be designed to accommodate the operation of these mechanisms to the character of the plastic substance that is being used at any one time as well as to the shape and size of the mold cavity. Such a molding machine may be structured for the mold table to rotate about either a horizontal or a vertical axis; and the hereinafter-described structures for metal insert encapsulation, may be arranged on either form of table.

For machines of this character, it is well known that hydraulically actuated devices provide the most sensitive means for close control of the timed movement of the die parts, the adjustment of the insert within the die cavity, where that is needed, and for controlling the injection rate of the plastic substance being forced into the die cavity.

The plastic encapsulation of metal objects, obviously, requires a preliminary support for the object within a cavity of an appropriately-structured die, having parts relatively movable between an open relationship and a closed relationship; means for positioning the object within the molded plastic body; means for retracting the support during the molding operation; and means for separating the die parts incident to the ejection of the molded body from the cavity and the reception of another object for encapsulation.

The adaptations of a structure and operation of such an object support means, and its operating relationship to the die, are diagrammatically illustrated in the drawings.

FIGURES 1 to 9 illustrate a preferred form and operation of the object support means for achieving either a complete encapsulation of an object or a partial encapsulation thereof. In these illustrations, the partial encapsulation operation involves keeping unexposed to the plastic substance a certain portion or portions of the object which remain in contact with the support means throughout the period of the injection and curing of the plastic substance in the mold cavity.

The FIGURES 1 through 4 and the FIGURES 5C through 9 indicate the sequence for the complete encapsulation of an insert or object. The sequences, obviously, begin with FIGURES 8 and 9, respectively showing the insert object being positioned on the movable support means (FIG. 8) and the support means and the one die part at the stage of their approach to the opposed die part wherein the insert is engaged by the opposed die part, whereupon the die parts become fully closed and the sequence of FIGURES 1 through 4 and 5C follow to complete the encapsulating procedure up to the point of the opening of the mold and the ejection of the encapsulated object, as shown in FIGURES 6 and 7.

FIGURE 5A shows a sequence step, following FIGURE 4, of retracting the movable object support to expose to the plastic that portion of the object which initially was in contact with the movable support. FIGURE 5B shows how, following the sequence step of FIGURE 4, the partially-encapsulated object may be permitted to retract with the movable support to expose to the plastic the end of the object which initially was in contact with the fixed support means, which here is the bottom of the cavity in the opposed die member.

To restate this, for emphasis, FIGURE 5A indicates the step between FIGURES 4 and 6 whereby one end only of the object is exposed to the plastic before reaching the ejection sequences of FIGURES 6 and 7; FIGURE 5B indicates the step between FIGURES 4 and 6 whereby the other end only of the object is exposed to the plastic before reaching the ejection sequences of FIGURES 6 and 7. And, FIGURE 5C indicates the step, between FIGURES 4 and 6 whereby both ends of the object—previously in contact, respectively, with the movable support and the opposite end wall of the cavity—are exposed to the plastic before reaching the ejection sequences of FIGURES 6 and 7. The insert, subject to the sequences of FIGURES 5A and 5B, becomes partially encapsulated, whereas the insert, subject to the sequence of 5C, become completely encapsulated.

Thus, in reading these figures, 1 through 9; it should be understood that FIGURES 5A, 5B and 5C each represents a sequence in three different complete cycles from FIGURES 8 and 9, for disposing an insert object 0 in a closed die, through the sequences of FIGURES 1 through 4, for the initial injection of the fluid plastic substance into the die cavity, and finally the ejection of the finished product exemplified by FIGURES 6 and 7.

Whatever may be the structure of the plastic molding machine, for practicing the method of complete or partial encapsulation of an insert object, the two die parts 15 and 16 would be mounted and connected to conventional means (not here shown) for the relative movement between closed and open positions, such as shown in the above-noted figures. The interiors of these die parts would be contoured to provide a cavity 17 for determining the configuration of the molded article and accommodating the type of insert 0 that is to be encapsulated. A suitable gate or inlet port 18 provides for the pressured injection of the encapsulating substance into the cavity 17.

The form of the support for the insert object 0 in the die cavity naturally will depend upon the character of the objects to be encapsulated and whether the object is to be totally encapsulated or only partially so. If the object is not to be totally encapsulated then the exposed or uncovered area, obviously, might be that which is in contact with the object support means within the die cavity. However, the object must be positioned in the cavity so that all of the area of the object that is to be covered by the plastic substance is spaced from the walls defining the die cavity.

The movable support for positioning an insert object 0 in the die cavity 17 here is shown as comprising two elements 19 and 20. The element 19 is in the nature of a sleeve reciprocably mounted on the die part 16 and slidably supporting the coaxial element 20, which is in the nature of a pin or rod. These two elements 19 and 20 are formed with heads 21 and 22, respectively, by means of which the positions of the elements 18 and 19, relative to each other and to the die parts 15 and 16, are determined during certain sequences of the encapsulating operation and for effecting the alternative results of complete or partial encapsulation of the object 0.

The lengths of the sleeve 19 and the pin 20 will, of course, be determined by the construction of the die part 16 and the over-all depth of the cavity 17 formed between the die parts 15 and 16 since, as will hereafter be shown, the sleeve 19 also serves the function of ejecting the molded article from the opened die and must therefore be of sufficient length to be projected to or beyond the inner face of the die part 16 during the ejection operation.

The opening and closing of the die parts 16 and 16 may be accomplished by conventional operating means, not shown, preferably hydraulically actuated, and the pressured operation of the insert support means 19 and 20 is also preferably done by conventional hydraulic means, an example of which is shown in FIGURES 14 to 17 inclusive.

At this point it should be understood that the operation and practice of the herein disclosed apparatus and process involves the controlled movement of the insert support means 19 and 20 while the die parts 15 and 16 are closed and the plastic material is being injected into the mold cavity 17. As shown, such controlled movement of the support means is effected by forces acting on the heads 21 and 22 in opposition to the hydraulic pressure of the injected plastic material and in the drawings these forces are indicated by the arrows A, B, and C in FIGURES 1 through 5. Such forces, acting on the elements 19 and 20 after the closing of the die parts 15 and 16, necessarily have to be coordinated with the injection pressure of the plastic substance into the cavity 17 and the movement of the elements 19 and 20, to produce the desired end result is determined by the timed variation of these forces during the injection cycle.

As is well known in the art of molding plastics, the degree and period of the injection pressure is influenced by the character of the plastic substance employed. In FIGURES 1 through 4 the arrows A indicate the direction of the force acting against the sleeve 19 and the arrows B and C indicate a pair of forces acting against the pin 20. Initially the forces B and C are such that, upon the closing of the die parts 15 and 16, the pin 20 is maintained in a fixed position on the molding die until such time as the insert engages the opposite die part and is forced into the sleeve 19 to the position shown in FIGURE 1. Then the pin 20 yields only sufficiently for the die parts to fully close. Thereafter the pressure of the injected plastic substance, acting against the exposed end of the sleeve 19, overpowers the force A and drives the sleeve 19 outwardly, as shown in FIGURES 2 and 3, until its free end 23 becomes flush with the free end 24 of the pin 20 as shown in FIGURE 4. Subsequently, the combined forces A, B and C are relaxed, according to predetermined plan and the continuing pressure of the injected plastic substance effects a further retraction of the pin 20 and a similar retraction of the sleeve 19, as indicated in FIGURES 5A, 5B and 5C for effecting, respectively, the alternate partial encapsulation of the object 0 or the total encapsulation of the object 0, by the sequences which now will be explained.

The method and the extent of encapsulating an object 0 by the above-described apparatus, is as follows:

*The first step* is the positioning of the object 0 in the open die and on the support elements 19 and 20, as shown in FIGURE 8, incident to activating the die part 16 to move toward closed relationship with the other die part 15, as shown in FIGURE 9, wherein the opposite end portion 26 of the object 0 is brought into contact with the end wall 27 of the cavity 17. During this step the object 0 is held by the sleeve 19 alone, until the die closes, and the sleeve is held, by the force A, with its head against the outer face 28 of the die part 16. Upon closing of the die parts 15 and 16 the object 0 is forced into the sleeve 19 against the end 24 of the pin 20 whereupon the pin is forced outwardly against the pressure B and the object is firmly clamped between the pin 20 and the end 27 of the cavity 17. Now the elements are as shown in FIGURE 1 and the system is ready for the injection to begin.

*The second step* is to initiate the injection of the plastic substance into the die cavity 17 through the gate 18. As the quantity and pressure of the plastic substance builds up in the limited cavity 17 of the dies 15 and 16, the hydraulic force acting on the free end 23 of the sleeve 19 retracts the sleeve against the holding force A, until the sleeve 19 recedes to a position disposing the free end 23 flush with the free end 24 of the pin 20, as shown initially in FIGURE 4. Such retraction of the sleeve 19 gradually exposes an increased area of the object 0 to the plastic substance filling the cavity 17, except those areas in contact with the end 24 of the pin 20 and with the end wall 27 of the cavity 17. When the sleeve 19 reaches the position of FIGURE 4, further retraction is limited by the forces B-C.

*The third step* is to effect a retraction of the pin 20 and sleeve 19, simultaneously, to bring their respective free ends 23 and 24 flush with the wall defining the adjacent end of the mold cavity 17. As will be obvious from FIGURE 5A, such a retraction of the sleeve 19 and pin 20 will leave a gap between the ends 23 and 24 of the support elements and the adjacent end of the object 0. The continued injection of the plastic substance, as coordinated with the time and rate of retraction of the sleeve 19 and the pin 20, will then cause the plastic substance to flow into this gap and enclose the end of the object 0. In this case the timing of the final retraction of the pin and sleeve is such that the viscosity of the plastic material, acting on the sides of the insert or object 0, will hold the object in its initial position.

Assuming that such an encapsulation of the object 0 is desired, that is with one end of the object exposed, the injection pressure will be released and the die part 16 will be withdrawn to the opened position shown in FIGURE 6. Then a subsequent elevation of the sleeve 19 and pin 20, relative to the die part 16, will eject the molded article 29 as shown in FIGURE 7.

*An alternate third step* would involve such a retraction of the sleeve 19 and pin 20 as to enclose with plastic that end 26 of the insert or object 0 which initially was in contact with the wall 27 of the die cavity 17. (See FIGURE 5B). In such event the pressure control means for the operation of the pin 20 and sleeve 19 would so condition the forces A, B and C, and regulate the timing of the final movements thereof in accordance with the rate of injection of the plastic substance into the mold cavity 17, as to allow the enveloping plastic to keep the object 0 in contact with the ends 23 and 24 of the sleeve 19 and pin 20 and cause the object 0 to recede in the die cavity to form a gap between the aforesaid end portion 26 and the wall 27 of the die cavity 17. As such a gap is forming, the pressured plastic substance will fill in and enclose the aforesaid end 26 of the object 0 and only the opposite end of the object will be exposed in the finished molded article 29.

Thereupon, the injection of the plastic substance into the die will be stopped and retraction of the die part 16 to open the die as shown in FIGURE 6 will occur and the molded article will be ejected as shown in FIGURE 7 and as previously explained.

*Another alternative third step* would involve such a retraction of the sleeve 19 and pin 20—from the positions shown in FIGURE 4—as to simultaneously or successively, as may be preferred, expose both end areas of the insert 0 which were in contact, respectively, with the pin 20 and the end wall 27 of the die cavity 17. In such event the means for controlling the forces A, B and C, acting on the sleeve 19 and pin 20, would be so coordinated with the injection speed and pressure of the plastic substance, as to permit an axial movement of the insert 0 in the die cavity 17 to form gaps between both of the ends of the insert and the respective support means, namely the pin 20 and the die wall 27. With the correct coordination of all these forces the shifting of the insert away from the end wall 27 would be effected by relaxing the forces B and C for a definite interval while the cavity 17 is only partly filled and then proceeding as in the case of the alternative shown in FIGURE 5A. The plastic substance would then enclose the two ends of the insert as indicated in FIGURE 5C.

The adaptation shown in FIGURES 10–13 differs from that shown in FIGURES 1 through 9 in these minor aspects. The primary of these minor differences is a pin 30 fixed in the die part 15 in axial opposition to the pin 20. In this adaptation the opposed ends of the pins 20 and 30 are rounded or of conical shape and the end parts extended into the die cavity 17. By providing the auxiliary pin 30 and so forming it and the pin 20 with their ends extending into the die cavity 17, reduces the end portions of the insert not exposed initially to the plastic substance injected into the die cavity 17. This will tend to simplify and expedite the complete encapsulation of an insert 0 since the fluid pressure of the plastic substance will act against the sleeve 19 and pin 20 simultaneously from the very beginning of the injection cycle. Also, it will be apparent that this adaptation is particularly designed for the complete encapsulation of the insert and provides a simple arrangement for precisely controlling the location of the insert longitudinally, in the molded article by merely varying the amount that the pin 20 extends into the cavity 17.

It will be seen that FIGURES 10 and 11 essentially correspond with FIGURES 8 and 1 respectively, of the preferred adaptation. FIGURE 12 corresponds with FIGURE 6 and FIGURE 13 corresponds with FIGURE 7.

The result shown in FIGURES 12 and 13 is a completely encapsulated object such as explained in the above "other alternative third step." However, it should be understood that this adaptation of FIGURES 10 through 13 could be employed to secure the same functioning sequences as set forth above in the "first" and "alternative third step."

It will now be understood that the improved method of encapsulating inserts in an injection molded article involves the predetermined adjustment of accurately controlled forces acting on the sleeve 19 and pin 20 in opposition to the hydraulic pressure of the injection fluid. Initially, the controlled force A will be slightly less than the injection pressure while the force B-C will be greater than the injection pressure and the variation or adjustment of these forces will be such that the "work" is done by the injection pressure in all phases of the molding cycle except the ejection of the molded article and the forcing outwardly of the pin 20, during closing of the mold, by the insert disposed in the supporting sleeve 19. The timing of the force changes during the injection cycle will, of course, be determined by the nature of the plastic substance being molded as well as by the injection pressure and will have to be calculated, according to known procedures, and then adjusted according to the geometry of the molded article. This will be readily understood by those skilled in this art and therefore need not be further discussed herein.

FIGURES 14 to 17 inclusive, of the drawings herein, show a schematic example of a system and means for operating the sleeve 19 and the pin 20 by hydraulic pressure; and as shown the operating means comprises a pair of coaxial cylinders and pistons arranged to act upon the sleeve and pin respectively, to control the movement thereof.

Referring particularly to FIGURE 14, it will be seen that the sleeve 19 and the pin 20 are at the open die position of FIGURE 8, wherein these elements are ready to receive the insert 0 shown in dotted outline. The dual piston and cylinder operating means for the sleeve 19 and pin 20 is contained in a motor housing or body 35, suitably mounted by means not shown on the rear or outer side of the die part 16, and comprises a hollow piston 36 acting on the head 21 of the sleeve 19 and having a bore 37, formed to slidably receive the head 22 of the pin 20 and a piston 38 slidable in the bore 37 for acting on the head 22.

The hollow piston 36 is designed to operate in a cylinder 39 of such a length as to provide a movement stroke for the piston 36, equal to the maximum axial movement intended for the sleeve 19. The piston 38 extends from the bore 37 to operate in a cylinder 40 formed coaxially with, and in axially spaced relation to the cylinder 39, the cylinders 39 and 40 being separated by a partition 41 which serves as a slide bearing for the piston 38 and as a stop for the head 42 on the rearward end of the piston 38. As will be understood, the length of the cylinder 40 is such as to afford a stroke movement for the piston 38 equal to the maximum axial movement intended for the pin 20.

The hydraulic system for the control of the pistons 36 and 38, is also shown in FIGURE 14, and in the form shown comprises a hydraulic pressure supply line 43 which, by branches 44 and 45, connects with the rearward ends of the cylinders 39 and 40 respectively. The supply line 43 is connected with a suitable source of hydraulic pressure, not shown, and is controlled by a solenoid actuated valve 46 which, when actuated, opens the supply line 43 to the source of pressure so as to charge the cylinders 39 and 40. As shown, each of the branch lines 44 and 45 is provided with a check valve 47 and 48, respectively, arranged to permit the cylinders 39 and 40 to become charged with hydraulic fluid and at the same time prevent any cross-flow of fluid under pressure from one cylinder to the other.

As indicated in FIGURE 14, the branch lines 44 and 45 are provided with bleed connections 49 and 50, respectively, which are controlled by adjustable pressure release valves 51 and 52, respectively. These pressure release valves 51 and 52 are of the conventional, commercially obtainable type adapted to be adjusted to hold closed up to a predetermined pressure and to open only when that pressure is exceeded.

Also, as shown, the branch line 45 is provided with an auxiliary bleed line 53, controlled by a solenoid actuated valve 54 arranged to open the line 53 when energized. It will be understood that the bleed lines 49 and 50, and the auxiliary bleed line 53, all lead to a common reservoir or sump not shown.

Thus, as shown in FIGURE 14, the hydraulic system for controlling the insert support elements 19 and 20, is at its fully charged position, wherein the cylinders 39 and 40 are charged with hydraulic fluid under a predetermined pressure, and the die parts are in condition to receive the insert and to be closed ready for an injection of the molding material.

At this point it should be understood that the hydraulic condition in the cylinders 39 and 40, is such that the forces acting on or resisting movement of the pistons 36 and 38 will be less than the forces generated by the injection pressure of the plastic molding material and acting on the free end 23 of the sleeve 19. The hydraulic pressure in the cylinder 39 will, of course, normally be the same as that in cylinder 40.

FIGURE 15 shows the positions of the insert support elements 19 and 20, and the respective piston positions, when the die parts 15 and 16 are closed and ready for the injection of molding material. In this condition it will be observed that the piston 38 has been forced rearwardly into its cylinder 40 by engagement of the end 26 of the insert 0 against the end wall 27 of the mold cavity 17 in the die part 15, it being understood that the forces closing the die parts 15 and 16 are greater than the injection pressure exerted on the cavity 17, and hence is greater than the hydraulic pressure produced in the cylinder 40. The control valve 52 for the bleed line 50 of the cylinder 40, being set to open when the pressure in the cylinder 40 exceeds a predetermined amount, automatically bleeds the hydraulic fluid from the cylinder 40 as the pin 20 and piston 38 are forced rearwardly by the closing action of the die parts 15 and 16.

FIGURE 16 shows the relationship of the elements when the insert supporting elements 19 and 20 are at the position shown in FIGURE 4, wherein the sleeve 19 has been retracted or forced rearwardly, by the hydraulic pressure of the injected plastic material, until its free end is flush with the free end of the pin 20 and the insert 0 is surrounded with molding material, except for the end 26 in contact with the cavity end wall 27 and the opposite end of the insert which is in contact with the pin 20.

FIGURE 17 shows the relation of the parts when the sleeve 19 and pin 20 are fully retracted, the insert 0 being disposed in the molded article 29, with the end 26 exposed and the opposite end fully enclosed, as shown in FIGURE 5A.

In the operation of the hydraulic control system, to accomplish the result indicated in FIGURE 5A and FIGURE 17 of the drawings, the injected plastic material, under its normal injection pressure, is allowed to shift the sleeve element 19 from the position shown in FIGURE 15 to the position shown in FIGURE 16, as the material flows into the mold cavity, the pressured fluid in the cylinder 39 bleeding out through the pressure release valve 51. When the sleeve 19 reaches the position of FIGURE 16 a suitable limit switch 55 is actuated by a pivoted, unidirectional acting finger 56, on the piston 36, to open the solenoid valve 54 and release the holding pressure on the pin 20 to permit the pin and sleeve 19 to be forced to the fully retracted position of FIGURE 17 by the inflowing plastic material. During this last step in the process the insert 0 is held at its initial position by the molding material surrounding the body of the insert and particularly that portion in the cavity of the die member 15. Thus, the insert 0 does not move from the position shown in FIGURE 16, and its end initially in contact with the end of the pin 20 becomes fully surrounded by the molding material as shown in FIGURE 17.

Then, upon completion of the injection cycle, the mold is opened and the die parts 15 and 16 are separated so that the molded article 29 can be ejected. Ejection of the molded article is accomplished by charging the hydraulic control cylinders 39 and 40 by actuating the solenoid valve 46 controlling the hydraulic fluid supply line 43. The solenoid valve 46 is energized by the operation of a suitable microswitch, not shown, disposed for actuation when the die parts 15 and 16 reach their fully opened position. When the cylinders 39 and 40 become fully charged, the respective pistons 36 and 38 are driven to their forwardmost position shown in FIGURE 14, during which movement the molded article is ejected as shown in FIGURE 7.

For the accomplishment of the molding operation indicated by FIGURE 5B, whereby the opposite end of the insert is exposed, the solenoid valve 54 is actuated to open the bleed line 45 at a point intermediate the condition shown in FIGURES 15 and 16, and before the ends of the sleeve 19 and the pin 20 are flush with each other. This allows the inflowing plastic molding material to pull the insert so as to follow the sleeve and pin to the end of their normal stroke, that is the position shown in FIG. 17, and the inflowing plastic material fills in the cavity behind the insert 0 in the die part 15, so that the insert is driven the entire distance to the opposite end of the cavity.

Such operation of the solenoid actuated valve 54 is accomplished by extending the switch means 55 outwardly from the position shown in FIGURES 14 to 17, that is to the left in said figures, so as to open the valve 54 at the appropriate point and hold it open until the end of the stroke movement of the sleeve 19.

For the molding operation shown in FIGURE 5C, wherein the insert is wholly enclosed in the molded article 29, the solenoid actuated valve 54 is momentarily opened shortly after the injection cycle begins. This permits the insert to move with the support sleeve and pin and the extent of such movement will, of course, be determined by the length of time that the valve 54 is open, or the amount of fluid that is allowed to bleed from the cylinder 40.

As shown in FIGURE 16, momentary operation of the valve 54 may be accomplished by means of a microswitch 57 suitably located in the path of the switching finger 56. After the shifting of the insert to the desired location axially of the molded article the molding operation is continued as in the FIGURE 5A procedure excepting only that final dumping or release of fluid from the cylinders 39 and 40 is caused at a slightly later time than in the FIGURE 5A procedure since the free ends of the sleeve and pin will not become flush until they have been further retracted from the mold cavity 17.

The main advantages of this invention reside in the improved method of encapsulating an insert in a molded article whereby the longitudinal position of the insert within the molded article can be readily controlled; in the relatively simple means for the performance of the new method; and in the fact that the method can be accomplished at normal injection pressures and flow rates.

Although several adaptations of the improved molding process have been herein illustrated and described it will be understood that details of the method and apparatus disclosed may be altered without departing from the spirit of the invention as defined by the following claims.

I claim:

1. The method of encapsulating an object in a plastic substance which consists in,
   first: supporting an object from opposite directions in a die cavity and generally in spaced relation with the walls of the die cavity;
   secondly: injecting a continuous flow of fluid plastic substance into the die cavity sufficient to envelop the exposed area of the said object and fill the cavity;
   thirdly: retracting the object support from one direction during injection of the plastic substance and controlling the speed of retraction of the said support in predetermined relation with the setting time of the plastic substance, and
   fourthly: removing the encapsulated object from the die cavity.

2. The method of encapsulating an object in a plastic substance which consists in,
   first: positioning the object on a retractably-mounted supporting element and in contact with an opposed wall in a molding die cavity;
   secondly: injecting a continuous flow of pressured fluid plastic substance into the die cavity to envelop the said object;
   thirdly: retracting the supporting element from the said object during the injection of the plastic substance and controlling the rate of retraction of the said support in predetermined relation with the setting time of the plastic substance to fix the position of the object in the die cavity by the setting plastic substance before the supporting element leaves the object and thereby expose the area of the object contacted by the supporting element for encapsulation by the plastic substance; and
   finally: removing the encapsulated object from the die cavity.

3. The method of encapsulating an object in a plastic substance which consists in,
   first: positioning the object on a first element mounting a reciprocable second element which partially embraces the object and disposes said object in spaced relationship from the walls of the cavity of an injection molding die;
   secondly: injecting a continuous controlled pressured flow of fluid plastic substance into the die cavity sufficient to fill the cavity and simultaneously retracting the second element at a predetermined controlled rate relative to the setting time of the plastic substance to withdraw the second element from the object after the object becomes fixed in its position in the die cavity by the setting plastic substance;
   thirdly: retracting the first element when the second element has been withdrawn and during the flow of plastic substance into the cavity to expose to the plastic substance the area of the object engaged by the first element; and
   finally: removing the encapsulated object from the die cavity.

4. The method of encapsulating an object in a plastic substance which consists in,
   first: positioning the object on a first element mounting a reciprocable second element which partially embraces the object and disposes it in contact with an opposed wall in a molding die cavity;
   secondly: injecting a continuous controlled pressured flow of a fluid plastic substance into the die cavity sufficient to fill the cavity and forcibly retract the second element so as to gradually increase the area of the object for contact by the injected plastic substance;
   thirdly: retracting the first element at a predetermined time during the retraction of the second element to withdraw the object from said opposed wall of the die cavity and to expose to the plastic substance the area of the object contacted by the opposed wall of the die cavity; and
   finally: removing the encapsulated object from the die cavity.

5. The method of encapsulating an object in a plastic substance which consists in,
   first: positioning the object on a first element mounting a reciprocable second element which partially embraces the object and disposes it in a molding die cavity in spaced relationship with the walls thereof and in endwise engagement with an opposed support;
   secondly: injecting a controlled pressured flow of a fluid plastic substance into the die cavity sufficient to fill the cavity and simultaneously forcibly retract the second element to gradually increase the area of the object for engagement by the plastic substance;
   thirdly: retracting the first element as the second element becomes retracted to a predetermined extent to withdraw the object from said opposed support and expose to the plastic substance the area of the object engaged by said opposed support, and then continuing the retraction of both said elements at a predetermined rate to fix the position of the object in the die cavity prior to the said elements becoming fully withdrawn from the object; and
   finally: removing the encapsulated object from the die cavity.

References Cited by the Examiner

UNITED STATES PATENTS

| 2,417,348 | 3/1947 | Carter | 264—254 |
| 2,465,799 | 3/1949 | Gravesen | 264—254 |
| 3,070,844 | 1/1963 | Warnken | 18—36 |
| 3,072,967 | 1/1963 | Mathews et al. | 18—36 |

FOREIGN PATENTS 962,726  12/1949  France.

OTHER REFERENCES

A.P.C. Application of Chapuis, Ser. No. 391,198, Pub. June 15, 1943 (abandoned).

ROBERT F. WHITE, *Primary Examiner.*

ALEXANDER H. BRODMERKEL, *Examiner.*

F. MARLOWE, L. S. SQUIRES, T. J. CARVIS,
*Assistant Examiners.*